United States Patent [19]

Yamaguchi et al.

[11] Patent Number: 4,664,932

[45] Date of Patent: May 12, 1987

[54] QUALITY IMPROVER FOR FROZEN DOUGHS

[75] Inventors: Takeshi Yamaguchi, Chiba; Atsuo Watanabe, Funabashi, both of Japan

[73] Assignee: Riken Vitamine Co., Ltd., Tokyo, Japan

[21] Appl. No.: 787,192

[22] Filed: Oct. 15, 1985

[30] Foreign Application Priority Data

Dec. 26, 1984 [JP] Japan .................................. 59-277698

[51] Int. Cl.$^4$ .............................................. A21D 10/00
[52] U.S. Cl. ...................................... 426/653; 426/549
[58] Field of Search ............................ 426/653, 19-26, 426/549

[56] References Cited

U.S. PATENT DOCUMENTS

| | | | |
|---|---|---|---|
| 3,894,155 | 7/1975 | Ono et al. ................................ | 426/19 |
| 4,374,151 | 2/1983 | Lindstrom et al. ................... | 426/19 |
| 4,450,177 | 5/1984 | Larson .................................. | 426/19 |

*Primary Examiner*—R. B. Penland
*Attorney, Agent, or Firm*—Armstrong, Nikaido, Marmelstein & Kubovcik

[57] ABSTRACT

A quality improver for frozen doughs wherein
(1) emulsifiers comprising at least one of glycerin fatty acid esters, polyglycerin fatty acid esters, diacetyl tartaric acid esters of monoglyceride, succinic acid esters of monoglyceride, sucrose fatty acid esters, soybean phospholipids, calcium stearoyl lactylate and sodium stearoyl lactylate are mixed with
(2) wheat gluten, and the resulted mixture are combined with
(3) polymeric substances comprises at least one of alginic acid, sodium alginate, propylene glycol alginate and xanthan gum, and
(4) at least one selected from cystine, sodium hyposulfite, protease and lactic acid and lactate are combined therewith.

6 Claims, No Drawings

QUALITY IMPROVER FOR FROZEN DOUGHS

DETAILED DESCRIPTION OF THE INVENTION

1. Field of Invention

The present invention relates to a quality improver for the frozen doughs of breads, doughnuts, steamed cake, etc.

In more detail, the invention relates to a quality improver for frozen doughs wherein 2.5 to 25 parts by weight of emulsifiers are mixed with 100 parts by weight of wheat gluten, and 2 to 15 parts by weight of polymeric substances and not more than 30 parts by weight of cystine, sodium hyposulfite, protease, lactic acid, lactate, etc. are combined therewith.

2. Description of the Prior Art

In general, it is said that, with frozen doughs using yeast, quality deteriorations such as volume, sense of eating, etc. are caused for the products after thawing and baking because of the extinction of yeast during storage of frozen dough, the destruction of the tissue of gluten in the dough by the reducing substances which are generated through the fermentation of yeast and the damage of the dough through the formation of large-sized ice crystals.

Therefore, in order to make the quality deteriorations during freezing as little as possible, adoption of manufacturing processes of the dough by no-time method and short-time proofing method which enable to decrease the fermentation of yeast prior to freezing and others have been contrived. However, in the manufacturing processes inhibiting the fermentation as these, new problems have arisen in that the flavor obtainable through the fermentation is insufficient in the final products and so on.

While, investigations on the improvement in the resistance of yeast against freezing have also been made from the aspect of quality improvement of yeast, but sufficient effects have not yet been obtained.

DETAILED DESCRIPTION OF THE INVENTION

In view of these problems of the frozen doughs, the invention has made it possible to inhibit the quality deteriorations caused during the storage in frozen dough to a minimum through the improvement in the properties of gluten in the frozen dough.

Although the invention may also be applied to the frozen dough by no-time method having been employed hitherto, the special feature thereof lies in that it can be applied to the manufacturing process wherein, as the sponge dough method, moulding and freezing are carried out after allowing yeast to ferment sufficiently. Of course, the effects of the product of the invention are not influenced by the manufacturing method.

By mixing the products of the invention in amounts 1 to 4% (based on the flour), preferably 2 to 3% at the time of the manufacture of bakery foods, voluminous and soft bakery foods can be obtained, and further, bakery foods with the same quality as that before freezing can be obtained also after freezing preservation, thawing and baking.

The following is an explanation of the products of the invention.

The products according to the invention are mainly composed of wheat gluten. Although ordinary vital gluten is used as the wheat gluten, modified gluten subjected to the treatment with reducing agent and fresh gluten extracted from the wheat can also be used. To the wheat gluten, one or not less than two of emulsifiers are mixed, wherein the compound can be made by mixing the gluten with the emulsifier or by allowing an aqueous dispersion of emulsifier to be adsorbed to the gluten. However, it is preferable to knead the emulsifier with fresh gluten and to dry and pulverize.

As the types of emulsifiers, one or not less than two of glycerin fatty acid esters, polyglycerin fatty acid esters, diacetyl tartaric acid esters of monoglyceride, succinic acid esters of monoglyceride, sucrose fatty acid esters, soybean phospholipids, calcium stearoyl lactylate and sodium stearoyl lactylate are used.

The amounts of emulsifier to be mixed are 2.5 to 25 parts by weight, preferably 5 to 15 parts by weight per 100 parts by weight of gluten (calculated as about 8% moisture of gluten).

When the amounts of emulsifier are less than 2.5 parts by weight, a sufficient effect cannot be obtained and, if the amounts of emulsifier increase to more than 25 parts by weight, products with excellent powder quality are difficult to obtain when liquid emulsifiers are used.

To the gluten thus obtained by mixing an emulsifier, one or not less than two among alginic acid, sodium alginate, propylene glycol alginate and xanthan gum are mixed. These polymeric substances are mixed at a rate of 2 to 15 parts by weight per 100 parts by weight of initial wheat gluten. A range of 5 to 10 parts by weight is preferable. When the amounts of polymeric substances are less than 2 parts by weight, a sufficient effect cannot be obtained and, if the amounts of polymeric substances are more than 15 parts by weight, the use of the present products is not preferable at the time of manufacturing bakery foods since the alteration of the dough-making process becomes necessary because of a drastic change of the amount of water absorption etc. The method for the compound goes well by kneading together with an emulsifier or by mixing the gluten with polymeric substances.

In the products of the invention, one or not less than two of cystine, sodium hyposulfite, protease, lactic acid and lactate can be mixed further in amounts not more than 30 parts by weight to the wheat gluten.

With regard to the amounts of these substances per 100 parts by weight of wheat gluten, cystine and sodium hyposulfite are mixed in an amounts 0.01 to 0.15 parts by weight, preferably 0.025 to 0.075 parts by weight. As the protease, all of those originating from pepsin, plant (papaya) and microorganism can be used and the amounts for the use thereof are 50 to 1000 units, preferably 100 to 500 units. Lactic acid or lactate (salt with sodium, potassium or calcium) is mixed in amounts 2.5 to 30 parts by weight, preferably 5 to 25 parts by weight.

These substances are used for usual bakery foods as they give extensibility to the dough of bakery food. But, in the invention, it has been found that these substances exhibit the improvement effects synergistically on the frozen dough by the combined use with emulsifiers and polymeric substances.

The products of the invention thus obtained can give voluminous and soft products even when using for breads, doughnuts and steamed cake not to be subjected to the freezing. Therefore, the uses thereof are not limited only to the frozen doughs.

In following, examples will be shown.

EXAMPLE 1

2.0 kg of soybean lecithin were added to 100 kg of crude gluten (dry solids basis, 33.3%) and the mixture was mixed for 15 minutes in vertical mixer (120 quarts). This was extended in thin film on the wire netting and dried to a moisture content of 8% in a shelf-type drier. Further, by using a Yaria pulverizer, 30 kg of powder with a size of 60 mesh were obtained. With 30 kg of this powder were mixed 1 kg of powder of alginic acid and 15 g of cystine to obtain product A of the invention.

EXAMPLE 2

30 kg of water were added to 20 kg of gluten in powder form (moisture 7.8%) and the mixture was kneaded in a vertical mixer to prepare fresh gluten. After adding 1.2 kg of sucrose fatty acid esters (HLB=11) to this, mixing was done for 15 minutes.

This was dried in a flash drier and pulverized to obtain 20 kg of powder with a size of 60 mesh.

To 20 kg of this powder were added 2 kg of xanthan gum and 2 kg of powdery lactic acid and the mixture was mixed homogeneously to obtain product B of the invention.

EXAMPLE 3

1.5 kg of diacetyl tartaric acid ester of oleic monoglyceride and 0.5 kg of diglycerin stearic monoester were added to 50 kg of fresh gluten (dry solids basis, 33.3%) and the mixture was mixed for 13 minutes in a vertical mixer. This was dried in a flash drier and pulverized to obtain 18 kg of powder with a size of about 80 mesh. To 18 kg of this powder were added 1 kg of sodium alginate and 1.5 kg of calcium lactate and the mixture was mixed homogeneously to obtain product C of the invention.

EXAMPLE 4

1 kg of powdery glycerin monostearic ester, 1 kg of succinic acid ester of palmitic monoglyceride, 0.6 kg of powdery alginic acid, 300 units of protease (Bioprase, Nagase Industries Co.) and 0.5 kg of sodium lactate were mixed homogeneously with 20 kg of active gluten in powder form (moisture 6.8%) to obtain product D of the invention.

COMPARATIVE EXAMPLE 1 kg of powdery alginic acid and 3 g of cystine were added to 10 kg of gluten in powder form (moisture 7.8%) and the mixture was mixed homogeneously to obtain product E.

Comparison test 1

Preparing yeast doughnuts by way of trial, the effects were compared therebetween.

1. Formula of yeast doughnut

| (Sponge) | | (Dough) | |
|---|---|---|---|
| Hard wheat flour | 50 parts | Hard wheat flour | 50 parts |
| Yeast | 6 parts | Sugar | 13 parts |
| Yeast food | 0.5 parts | Salt | 1.2 parts |
| Sugar | 2 parts | Baking powder | 2 parts |
| Whole egg | 10 parts | Yeast | 3 parts |
| Water | 24–27 parts | Shortening | 10 parts |
| | | Water | 25 parts |

2. Manufacturing process of yeast doughnut

| | |
|---|---|
| Mixing time and mixing temperature | (Sponge) L 3 min., H 1 min. (22° C.) |
| | (Dough) L 3 min., H 1 min. (Addition of shortening) L 3 min., H 9 min. (25° C.) |
| Sponge fermentation | 120 min. |
| Floor time | 30 min. |
| Punching time | 150 sec. |
| Moulding | Used Rheon automatic machine |
| Freezing | −35 ~ −40° C. |
| Thawing | Room temperature, 1 hr. |
| Final proofing | 40° C., 50% RH., 1 hr. |
| Frying | 180° C., Surface 2 min. Backside 2 min. |

3. Results

| | At time without freezing | | At time with freezing for 1 week | |
|---|---|---|---|---|
| Classification of test | Specific volume | Sense of eating | Specific volume | Sense of eating |
| Without improver added | 2.9 cc/g | Slightly heavy | 2.5 cc/g | Heavy |
| Addition with 2% of product A of the invention | 3.3 cc/g | Light and excellent | 3.2 cc/g | Light and excellent |
| Addition with 2% of product C of the invention | 3.4 cc/g | Light and excellent | 3.3 cc/g | Light and excellent |
| Addition with 2% of product E in comparative example | 3.0 cc/g | Good | 2.7 cc/g | Slightly heavy |

Comparison test 2

Preparing mini bean-jam buns by way of trial, the effects were compared therebetween.

1. Formula of mini bean-jam bun

| (Sponge) | | (Dough) | |
|---|---|---|---|
| Hard wheat flour | 70 parts | Hard wheat flour | 30 parts |
| Yeast | 3 parts | Yeast | 2 parts |
| Yeast food | 0.5 parts | Sugar | 30 parts |
| Glucose | 5 parts | Salt | 0.5 parts |
| Whole egg | 15 parts | Shortening | 6 parts |
| Water | 32–35 parts | Skimmilk powder | 2 parts |
| | | Water | 10 parts |

2. Manufacturing method of mini bean-jam bun

| | |
|---|---|
| Mixing time and mixing temperature | (Sponge) L 3 min., H 1 min. (26° C.) |
| | (Dough) L 3 min., H 1 min. (Addition of shortening) L 7 min., H 9 min. (29° C.) |
| Sponge fermentation | 150 min. |
| Floor time | 60 min. |
| Punching time | 40 sec. |
| Moulding | Used Rheon automatic bean jam wrapper machine |
| Final proofing | 40° C., 80% RH., 40–50 min. |
| Oven | 230° C., 6 min. |

3. Results

| | At time without freezing | | At time with freezing for 1 week | |
|---|---|---|---|---|
| Classification of test | Volume of 5 buns | Sense of eating | Volume of 5 buns | Sense of eating |
| Without improver added | 480 cc | Good | 420 cc | Heavy and sticky |
| Addition with 2% of product B of the invention | 550 cc | Light and excellent | 535 cc | Light and excellent |
| Addition with 2% of product D of the invention | 540 cc | Light and excellent | 520 cc | Light and excellent |
| Addition with 2% of active gluten | 505 cc | Good | 485 cc | Slightly heavy |

What is claimed is:

1. A dough improver composition for frozen doughs consisting essentially of 2.5 to 25 parts by weight of at least one emulsifiers selected from the group consisting of glycerin fatty acid esters, polyglycerin fatty acid esters, diacetyl tartaric acid esters of monoglyceride, succinic acid esters of monoglyceride, sucrose fatty acid esters, soybean phospholipids, calcium stearoyl lactylate and sodium stearoyl lactylate mixed with 100 parts by weight of wheat gluten, and 2 to 15 parts by weight of at least one polymeric substance selected from the group consisting of alginic acid, sodium alginate, propylene glycol alginate and xanthan gum and not more than 30 parts by weight of at least one compound selected from the group consisting of cystine, sodium hyposulfite, protease and lactic acid or lactate.

2. A frozen dough composition comprising a frozen dough containing flour and 1 to 4%, based on the weight of the flour, of the dough improver composition of claim 1.

3. A method for improving the quality of frozen dough containing flour, said method comprising the step of adding 1 to 4% of the dough improver composition of claim 1 to the flour used in manufacturing the frozen dough.

4. A dough improver composition for frozen doughs consisting essentially of 5 to 15 parts by weight of at least one emulsifiers selected from the group consisting of glycerin fatty acid esters, polyglycerin fatty acid esters, diacetyl tartaric acid esters of monoglyceride, succinic acid esters of monoglyceride, sucrose fatty acid esters, soybean phospholipids, calcium stearoyl lactylate, and sodium stearoyl lactylate mixed with 100 parts by weight of wheat gluten, and 5 to 10 parts by weight of at least one polymeric substance selected from the group consisting of alginic acid, sodium alginate, propylene glycol alginate and xanthan gum and 0.01 to 0.15 parts by weight of cystine or sodium hyposulfite, 50–1000 units of protease, and 2.5 to 30 parts by weight of lactic acid or lactate.

5. A frozen dough composition comprising a frozen dough containting flour and 1 to 4%, based on the weight of the flour, of the dough improver composition of claim 4.

6. A method for improving the quality of frozen dough manufactured from flour, said method comprising the step of adding 1 to 4% of the dough improver composition of claim 4 to the flour used in manufacturing the frozen dough.

* * * * *